United States Patent
Chang

(10) Patent No.: US 8,913,705 B2
(45) Date of Patent: Dec. 16, 2014

(54) DYNAMIC SKEW CORRECTION IN A MULTI-LANE COMMUNICATION LINK

(75) Inventor: Bruce J. Chang, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 13/595,338

(22) Filed: Aug. 27, 2012

(65) Prior Publication Data
US 2014/0056370 A1 Feb. 27, 2014

(51) Int. Cl.
*H04L 25/00* (2006.01)
*H04J 3/06* (2006.01)

(52) U.S. Cl.
CPC ............................. *H04J 3/062* (2013.01)
USPC ........... 375/372; 375/259; 375/316; 375/354; 375/362; 375/371; 370/509; 370/514; 713/400; 713/503; 710/52

(58) Field of Classification Search
CPC ........... H04J 3/06; H04J 3/062; H04J 3/0623; H04J 3/07; H04J 3/073; H04J 3/076; H04L 49/901; H04L 49/9084; H04L 49/9094; H04L 25/14; G06F 13/385
USPC ................. 375/259, 316, 354, 362, 371, 372; 370/509, 514; 713/400, 503; 710/52
See application file for complete search history.

(56) References Cited

U.S. PATENT DOCUMENTS

| | | | |
|---|---|---|---|
| 5,719,862 A | 2/1998 | Lee et al. | |
| 6,687,844 B1 | 2/2004 | Zhang | |
| 7,570,659 B2 | 8/2009 | Susnow et al. | |
| 7,631,118 B2* | 12/2009 | Renaud et al. | 710/52 |
| 8,073,090 B2* | 12/2011 | Zhang et al. | 375/362 |
| 2007/0177701 A1* | 8/2007 | Thanigasalam | 375/372 |
| 2012/0030438 A1 | 2/2012 | Shafai et al. | |

OTHER PUBLICATIONS

Ravi Kammaje "Alignment and Skew Correction Techniques in PCIe 3.0" LSI Corporation 2009 PCI-SIG pp. 1-22.

* cited by examiner

*Primary Examiner* — Leon Flores
(74) *Attorney, Agent, or Firm* — Meyertons Hood Kivlin Kowert & Goetzel; Stephen J. Curran

(57) ABSTRACT

A mechanism for dynamic skew correction in a multi-lane communication link includes a receiver unit including, for each of the lanes, a first-in first-out (FIFO). The FIFO may store received symbols to locations pointed to by a write pointer and output to downstream logic, symbols stored at locations pointed to by a read pointer. The receiver may also include a symbol drop unit that disables the write pointer in response to receiving a start alignment symbol, and enables the write pointer in response to receiving an end alignment symbol. The receiver also includes an alignment unit that disables the read pointer in response to detecting that the end symbol has been received at least one lane but not all lanes. In addition, the alignment unit may enable the read pointer in response to a determination that the end symbol has been received on all lanes.

22 Claims, 5 Drawing Sheets

DYNAMIC SKEW CORRECTION IN A MULTI-LANE COMMUNICATION LINK

BACKGROUND

1. Technical Field

This disclosure relates to communication links, and more particularly to dynamic skew correction in multi-lane links.

2. Description of the Related Art

Many communication links employ multiple communication lanes that operate simultaneously. In such an environment, lane to lane skew may be problematic. The skew may be expressed as a difference in arrival time of bit streams on each lane at the receiver's side, even though the bit streams were transmitted simultaneously at the transmitter side. Generally, the skew may be classified as either static or dynamic and each may be caused by a variety of factors.

For example, one source of static skew may be wiring trace length variations between lanes, whether the traces are on a circuit board or an integrated circuit. Another source may be wire bond impedance variations between lanes. Another source of static skew may be variations in clock domain crossing latencies between lanes from recovered clock to local clock. Typically, static skew may be corrected using variety of well-known techniques. For example, during link training, only link training order sets (and no data) are transferred over the link. This makes static skew relatively straightforward to correct.

Dynamic skew, however, may be caused by variations in process, voltage, and temperature between lanes over time when the link is in the active state and transfers data packets. In addition, dynamic skew may be caused by different numbers of SKIP (SKP) ordered sets (SKP OS) between lanes introduced by either separate clock architectures, or by a channel retimer. Further, dynamic skew may be caused by variations in idle cycles introduced by per lane incoming bit stream decoders. The dynamic skew typically occurs during data packet transfer and may introduce cyclic redundancy code (CRC) errors, which may result in a link re-initialization, link re-training, or link recovery, all of which can degrade link performance.

Conventional methods to address dynamic skew are not optimal and include forcing a re-initialization, adding buffer hardware, forcing vendors of the retime circuit to guarantee that the number of SKP symbols within the SKP OS will always be the same across all transmit lanes, using side band signals, among others.

SUMMARY OF THE EMBODIMENTS

Various embodiments of a mechanism for dynamic skew correction in a multi-lane communication link are disclosed. In one embodiment, a receiver unit for connection to a communication link having a number of communication lanes includes for each of the lanes a first-in first-out (FIFO) unit including a number of storage locations. The FIFO unit may be configured to store received symbols to locations pointed to by a write pointer and to output to downstream logic, the symbols stored at locations pointed to by a read pointer. The receiver may also include a symbol drop unit that may be configured to disable the write pointer in response to receiving a start symbol of a set of alignment symbols, and to enable the write pointer in response to receiving an end symbol of the set of alignment symbols. The receiver may also include an alignment unit that may be configured to disable the read pointer in response to detecting that the end symbol has been received on one or more lanes but not all lanes of the communication link. In addition, the alignment unit may be further configured to enable the read pointer in response to a determination that the end symbol has been received on all lanes of the communication link. Accordingly, any alignment symbols appearing on a given lane after the start symbol and before the end symbol may not be stored in the FIFO unit.

In one specific implementation, the receiver unit may also include a symbol assertion unit coupled to the FIFO unit and configured to generate dummy alignment symbols for transmission to the downstream logic while the read pointer is disabled.

Figure 1:
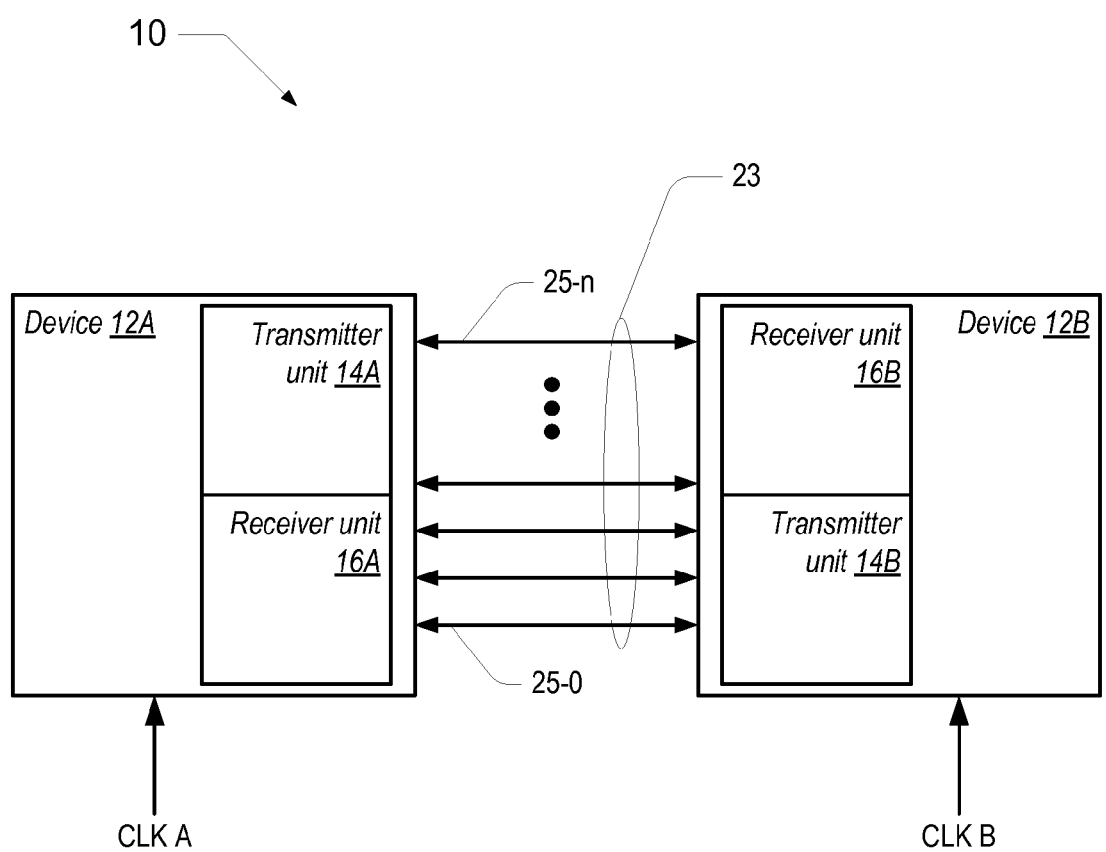
FIG. 1 is a block diagram of one embodiment of a system including a pair of devices coupled by a multi-lane communication link.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

Turning now to FIG. 1, a block diagram of one embodiment of a system including two devices coupled together by a multi-lane communication link is shown. The system 10 includes a device 12A coupled to device 12B via a multi-lane communication link 23. Device 12A is coupled to receive a clock signal CLK A, and device 12B is coupled to receive a clock signal CLKB. It is noted that components having a reference designator that includes both a number and a letter may be referred to by the number only where appropriate.

In the illustrated embodiment, the device 12A includes a transmitter unit 14A and a receiver unit 16A, while device 12B includes a transmitter unit 14B and a receiver unit 16B. In addition, the multi-lane communication link 23 includes multiple lanes designated 25-0 through 25-n, where n may be any whole number greater than zero.

In various embodiments, the link 23 may be representative of any type of communication link. However, in one embodiment, the link 23 may be representative of a peripheral component interconnect express link (PCIe), and in particular, a third generation (Gen3) PCIe link. Accordingly, each of the lanes 25 may be representative of bidirectional high speed serial links.

Figure 2:
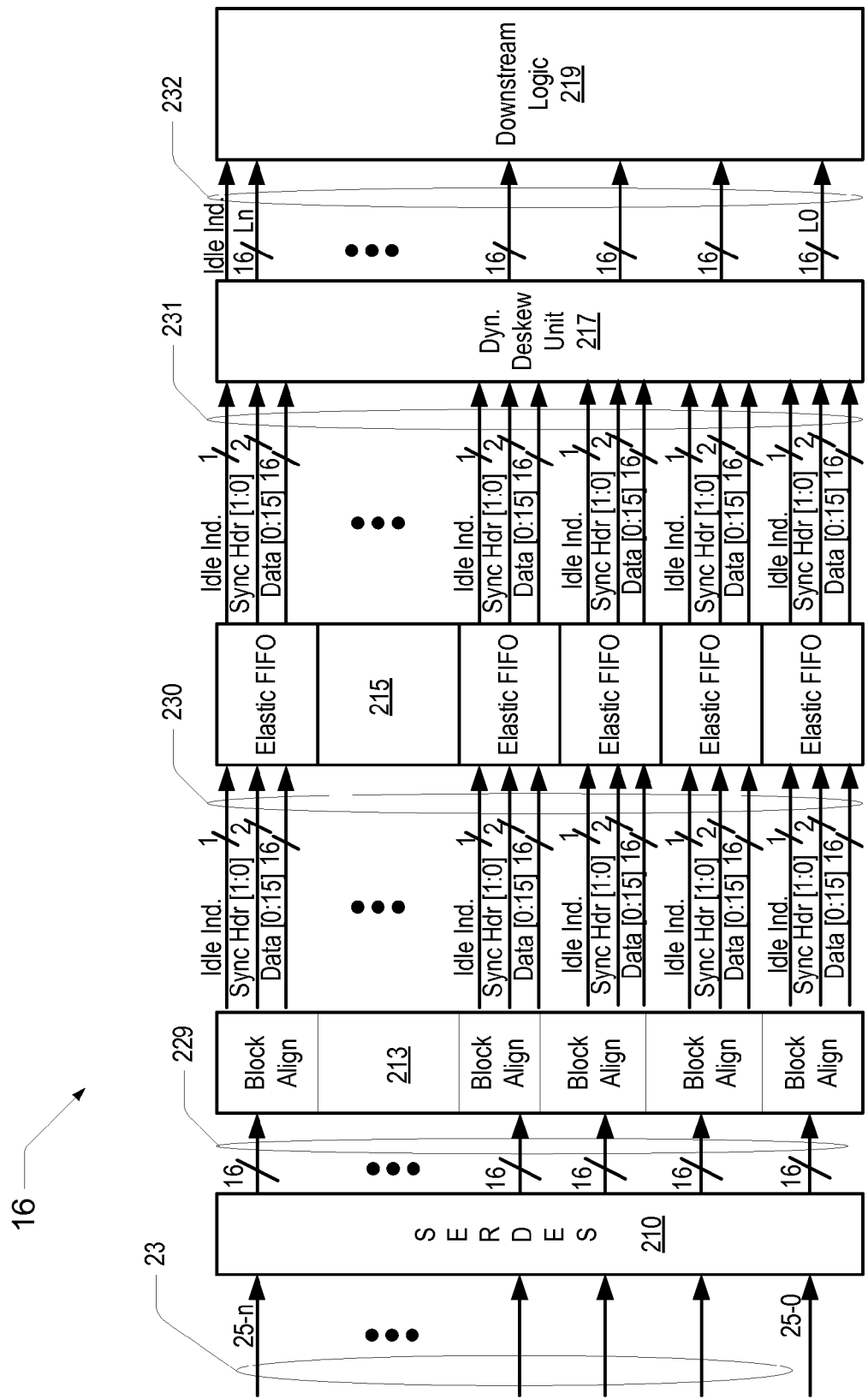
FIG. 2 is a block diagram of one embodiment of a portion of a receiver unit of one of the devices of FIG. 1.

In such an embodiment, and as shown in FIG. 2, the receiver units 16 may include a serializer/deserializer (SERDES) unit for each lane, which may transform the serial bit stream conveyed on the lanes 25 to parallel data conveyed within the devices 12. In addition, as described further below, to compensate for a variety of sources of dynamic skew, each of the receiver units 16 may include a dynamic deskew unit (e.g., deskew unit 217 of FIG. 2 and FIG. 3) that may be configured to dynamically compensate for differing numbers of symbols in SKP ordered sets which may be injected due to clock drift (e.g., between CLKA and CLKB) across the lanes 23. Further, the deskew unit may be configured to compensate for the asynchronous occurrence of non-data idle cycles or "bubbles" inserted into the bit stream by, for example, upstream decoder circuits (not shown in FIG. 1).

Referring to FIG. 2, a block diagram of one embodiment of a portion of a receiver unit of one of the devices of FIG. 1 is shown. It is noted that components that correspond to components shown in FIG. 1 have been numbered identically for clarity and simplicity. The receiver unit 16 of FIG. 2 includes a SERDES unit 210 coupled to receive bit streams via the lanes 25 of the multi-lane link 23. The SERDES unit 210 is coupled to a block align unit 213 via a parallel link 229 that includes a number of multi-bit parallel links. The block align unit 213 includes a per lane block align unit for each lane of the multi-lane link 23. The per lane block align unit 213 is coupled to a number of elastic first-in first-out (FIFO) buffers 215 via a multi-bit parallel link 230 that is similar to the link 229. As shown there is one elastic FIFO 215 for each lane of the multi-lane link 23. The elastic FIFOs 215 are coupled to the dynamic skew unit 217 via a multi-bit parallel link 231. The dynamic skew unit 217 is, in turn, coupled to downstream logic 219 via a multi-bit parallel link 232.

As shown, the link 229 includes one multi-bit lane for each serial lane of the link 23. In this embodiment, each lane of the link 229 includes 16 bits, although other numbers of bits are possible and contemplated. In addition, for each lane of the multi-lane link 23, the links 230 and 231 each include a 16-bit parallel link for conveying a 16-bit data payload, a 2-bit parallel link for conveying sync header information, and a single bit link for conveying Idle cycle information.

As mentioned above, the dynamic deskew unit 217 may dynamically compensate for differing numbers of symbols in SKP ordered sets, and may dynamically compensate for the asynchronous occurrence of non-data idle cycles or "bubbles" inserted into each lane of the multi-lane link 230 and 231.

In one embodiment, the block align unit 213 may receive the parallel data from the SERDES 210 and provide it to the elastic FIFOs 215. The block alignment units 213 may inject idle cycles, and the elastic FIFOs 215 may add or delete SKP symbols from the SKP ordered sets. The SKP ordered sets are alignment symbols and each one includes 12 SKP symbols. The first symbol is labeled as a SKP Head Symbol using the 2-bit sync header. A SKP ordered set also includes an additional SKP End Symbol and three linear feedback shift register (LFSR) symbols. Thus, one SKP ordered set has 130 bits and is also referred to as one SKP ordered set block. Accordingly, a transmitter unit such as transmitter units 14 of FIG. 1, for example, will always transmit 12 SKP symbols in a SKP ordered set.

However, due to issues such as clock drift between the transmitter and receiver, and clock jitter issues across lanes at the receiver unit, for example, SKP symbols may be deleted or added at each lane so that the number of SKP symbols may not be consistently 12 in each lane. In one embodiment, the number of SKP symbols may range from 4 to 20. In addition, decoder circuits such as 128b/130b decoder circuits (not shown) in each lane within the block align unit 213 may inject an idle cycle. More particularly, data may be transferred in units of 128-bit "blocks" with a 2-bit "sync header" at the start of the block. In a 16-bit data-path from the SERDES 210, the 128b/130b decoder may extract one block from a data stream at every 8.125 cycle. In other words, the 128b/130b decoder within each block alignment unit 213 may create one idle cycle or "bubble" every 65 cycles. The 128/130b decoder within the block align unit may inject the idle cycle to the elastic FIFO 215 after transferring 8 blocks to the elastic FIFO 215. The elastic FIFO 215 will forward the Idle indication signal to Dynamic Skew Unit 217. However, the bubbles are not aligned across the lanes, and are thus asynchronous among the lanes.

Accordingly, as described in greater detail below, the dynamic deskew unit 217 may dynamically readjust storage buffer (FIFO) depth to accommodate differing numbers of symbols in SKP ordered sets. Further, the deskew unit 217 may be configured to synchronize across all lanes, for downstream logic, the asynchronous occurrence of the bubbles. By doing so, the dynamic deskew unit 217 may realign and resynchronize the data in each lane. This may be done without adding a lot of additional circuits (e.g., additional FIFO before the deskew FIFO of FIG. 3) and corresponding area, and without forcing vendors to guarantee the number SKP symbols sent as mentioned above.

Figure 3:
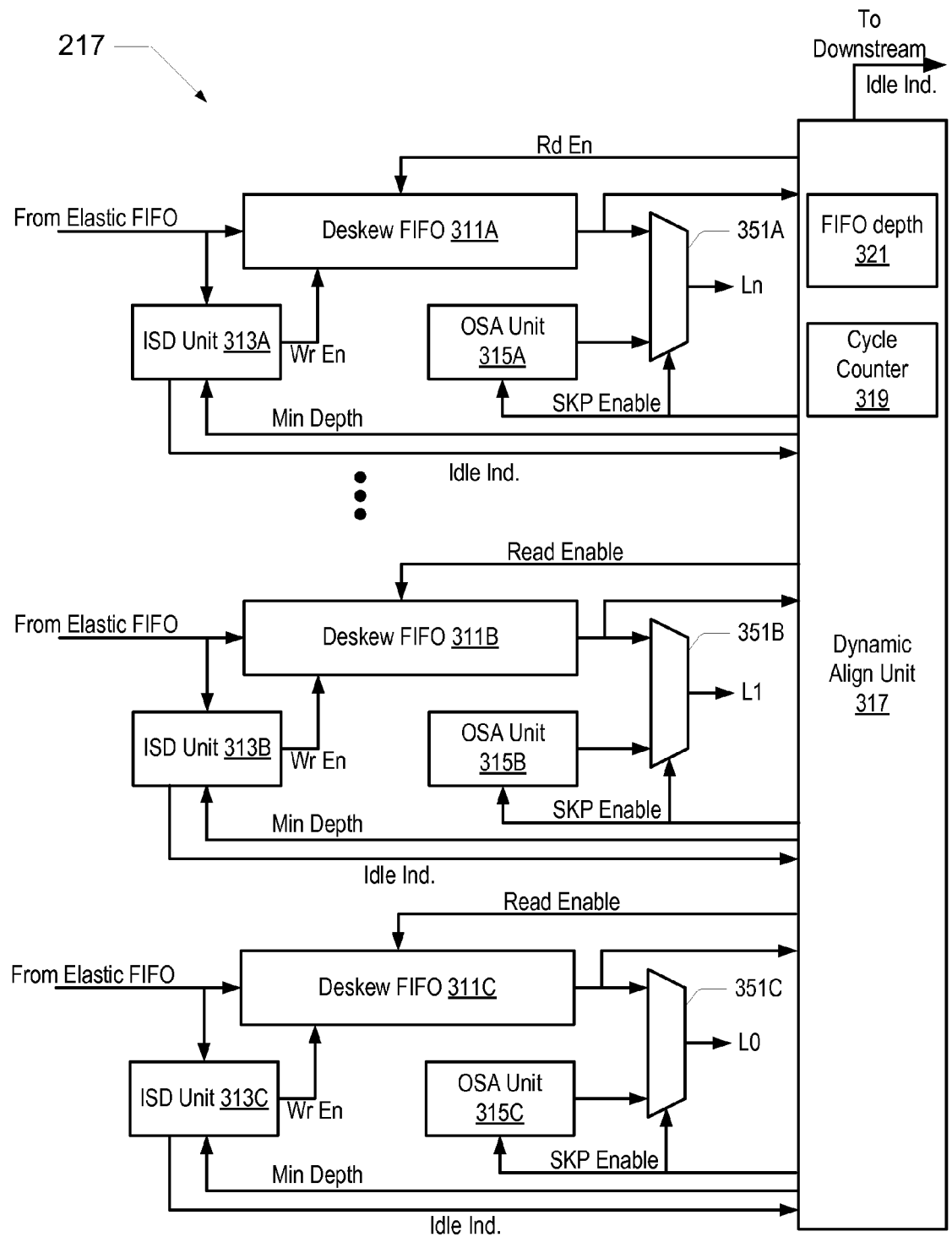
FIG. 3 is a block diagram of one embodiment of a dynamic deskew unit of FIG. 2.

Turning to FIG. 3, a block diagram of one embodiment of the dynamic deskew unit of FIG. 2 and FIG. 3 is shown. The deskew unit 217 includes deskew logic that includes deskew FIFOs (e.g., 311A, 311B, and 311C) and additional logic (e.g., 313A-313C, and 315A-315C) for each lane of the multi-lane link 23. As such, in FIG. 3, the outputs of each of the multiplexers 351 correspond to lane 0 (L0), lane 1 (L1), and lane n (Ln), n being any number, and is coupled to downstream logic (e.g., 219 of FIG. 2). The deskew logic corresponding to each lane will be described in detail, but not specifically for a given lane because the logic for each of the lanes operates similarly. It is noted that as shown in FIG. 2, the output of the multiplexers (e.g., 351A, 351B, and 351C) to downstream logic 219 is parallel data.

Each deskew FIFO 311 is coupled to receive data from a respective elastic FIFO (e.g., 215 of FIG. 2) for the corresponding lane and to provide data to the dynamic alignment unit 317 of FIG. 3 and to downstream logic (e.g., 219 of FIG. 2) through one input of the corresponding multiplexers 351 of FIG. 3. The logic for each lane also includes an incoming SKP symbol drop (ISD) unit 313 which is coupled to the deskew FIFO 311, the dynamic alignment unit 317, and to receive the data and the Idle indication from the respective upstream elastic FIFO. The logic for each lane also includes an outgoing SKP symbol assertion (OSA) unit 315A that is coupled to the other input of the multiplexer 351, and to the dynamic alignment unit 317.

As shown in FIG. 3, the ISD unit 313 is configured to provide a write enable signal (Wr En) to the deskew FIFO 311. In one embodiment, the write enable signal may lock or unlock the write pointer of the deskew FIFO 311A, thereby disabling and enabling, respectively, the ability to write into the deskew FIFO 311. As the symbols arrive from the elastic FIFO, the ISD unit 313 inspects each symbol and selectively asserts (enables) the Wr En signal dependent what the incoming symbol is. More particularly, in response to detecting a SKP OS Head symbol, the ISD unit 313 may, after allowing the SKP OS Head symbol to be written into the deskew FIFO 311, lock the write pointer by de-asserting the Wr En signal to the deskew FIFO 311, unless the depth of the deskew FIFO 311 is already at its minimum depth (e.g., two entries), in which case it may not lock the write pointer. In addition, the ISD unit 313 may be configured to re-assert the Wr En signal in response to receiving a SKP OS End symbol, thereby allowing the SKP OS End symbol to be written into the deskew FIFO 311.

In one embodiment, the dynamic alignment unit 317 is configured to monitor the output of all of the deskew FIFOs 311, and to detect the occurrence of the SKP OS Head and End symbols. In addition, in response to detecting that SKP OS Head symbols have arrived in the head of all the deskew FIFOs 311, the dynamic alignment unit 317 is configured to begin looking for a SKP OS End symbol to arrive at any deskew FIFO 311. In response to detecting that a SKP OS End symbol is at the head of any of the deskew FIFOs 311, but not all of the deskew FIFOs 311, the dynamic alignment unit 317 is configured to de-assert the read enable (Rd En) signal to the deskew FIFO 311 that received the SKP OS End symbol. The de-assertion of the Rd En signal locks (i.e., disables) the read pointer and prevents the read pointer from incrementing to the next location. In addition, the dynamic alignment unit 317 is configured to provide an SKP enable signal to the mux 351 and to the OSA unit 315. In response, the OSA unit 315 is configured to output a pre-determined SKP symbol. In addition, the SKP enable signal may cause the mux 351 to select the output of the OSA unit 315 as the mux output. In response to the dynamic alignment unit 317 determining that a SKP OS End symbol has been received by all of the deskew FIFOs 311, the dynamic alignment unit 317 is configured to unlock all of the read pointers and to disable the SKP enable signal to the OSA unit 315 and the multiplexer 351.

In addition, as mentioned above, the upstream decoder logic within the block alignment unit 213 on each lane may create an idle cycle in the data stream every 65 cycles or after eight blocks have been transferred to the elastic FIFOs 215. The idle cycle follows the eight blocks and arrives at the dynamic skew unit 217. Due to skew, these idle cycles may arrive during different cycles on each lane. The decode logic does provide an indication (e.g., Idle indication) when an idle cycle is created to notify downstream logic that the data is non-data or garbage. Accordingly, in one embodiment, the ISD unit 313 is configured to detect the Idle indication, and to de-assert the Wr en signal to the deskew FIFO 311 to prevent that non-data from being written into the deskew FIFO 311. To resynchronize the data for downstream logic, the dynamic alignment unit 317 is configured to provide an idle cycle once every 65 cycles on all lanes. The cycle counter 319 within the dynamic alignment unit 317 is configured to keep track of the number of cycles since sending the last idle cycle. When the cycle counter 319 counts the $65^{th}$ cycle, the dynamic alignment unit 317 is configured to de-assert the Rd En signal on each deskew FIFO, which will allow the same data or non-data to be sent to the downstream logic in the next cycle. The dynamic alignment unit 317 is configured to provide a NOP or Idle cycle indication signal to notify downstream logic that the data is non-data or garbage.

When the ISD unit 313 de-asserts the Wr_En signal to the deskew FIFO 311, the depth of the deskew FIFO 311 decrements because the DAL unit 317 is still reading the deskew FIFO 311. Conversely, when the DAL unit 317 de-asserts the Rd En signal to the deskew FIFO 311, the depth of the deskew FIFO 311 increments because the Wr En is still enabled, thereby allowing symbols to be written into the deskew FIFO 311. Thus, sufficient buffer space or a minimal depth needs to be maintained within the deskew FIFO 311 to compensate for the idle cycle received from upstream 128/130 decoder to ensure that an underflow condition does not could occur. Thus, by locking the write pointer in response to a SKP OS Head symbol, the dynamic alignment unit 317 effectively purges the deskew FIFO 311 by reducing the depth. If the depth is already at a minimum, there is no need to lock the write pointer. Accordingly, in one embodiment, FIFO depth unit 321 in the dynamic alignment unit 317 may track the number of entries in the deskew FIFO 311. In one embodiment, the FIFO depth unit 321 may be configured to provide a minimum depth signal (e.g., Min Depth) to the ISD unit 313 in response to the FIFO depth being at two entries. The Min Depth signal, when asserted by the FIFO depth unit 321, may inhibit the ISD unit 313 from locking the write pointer when it detects the SKP Head symbol.

In addition, if the eight blocks ahead of the idle cycle include a SKP ordered sets block, the elastic FIFO 215 may delete SKP symbols within the SKP ordered sets. The deskew FIFO 311 may receive two idle cycles within 65 cycles. As mentioned above, if an idle cycle arrives when the FIFO depth is two, locking the write pointer would cause the FIFO depth to decrease to one. Further, if another idle cycle arrives while before the DAL unit 37 lock the read pointer, the depth of the deskew FIFO 311 may decrement to zero and an underflow condition could occur in the deskew FIFO 311. This is unacceptable. Thus, in one embodiment, in response to receiving an Idle indication when the FIFO depth is at a minimum, the FIFO depth unit 321 may be configured to lock all read pointers for one cycle, and send a an Idle indication to downstream logic. In this way, both the write and read pointers are locked for one cycle and the FIFO depth is not affected.

Figure 4:
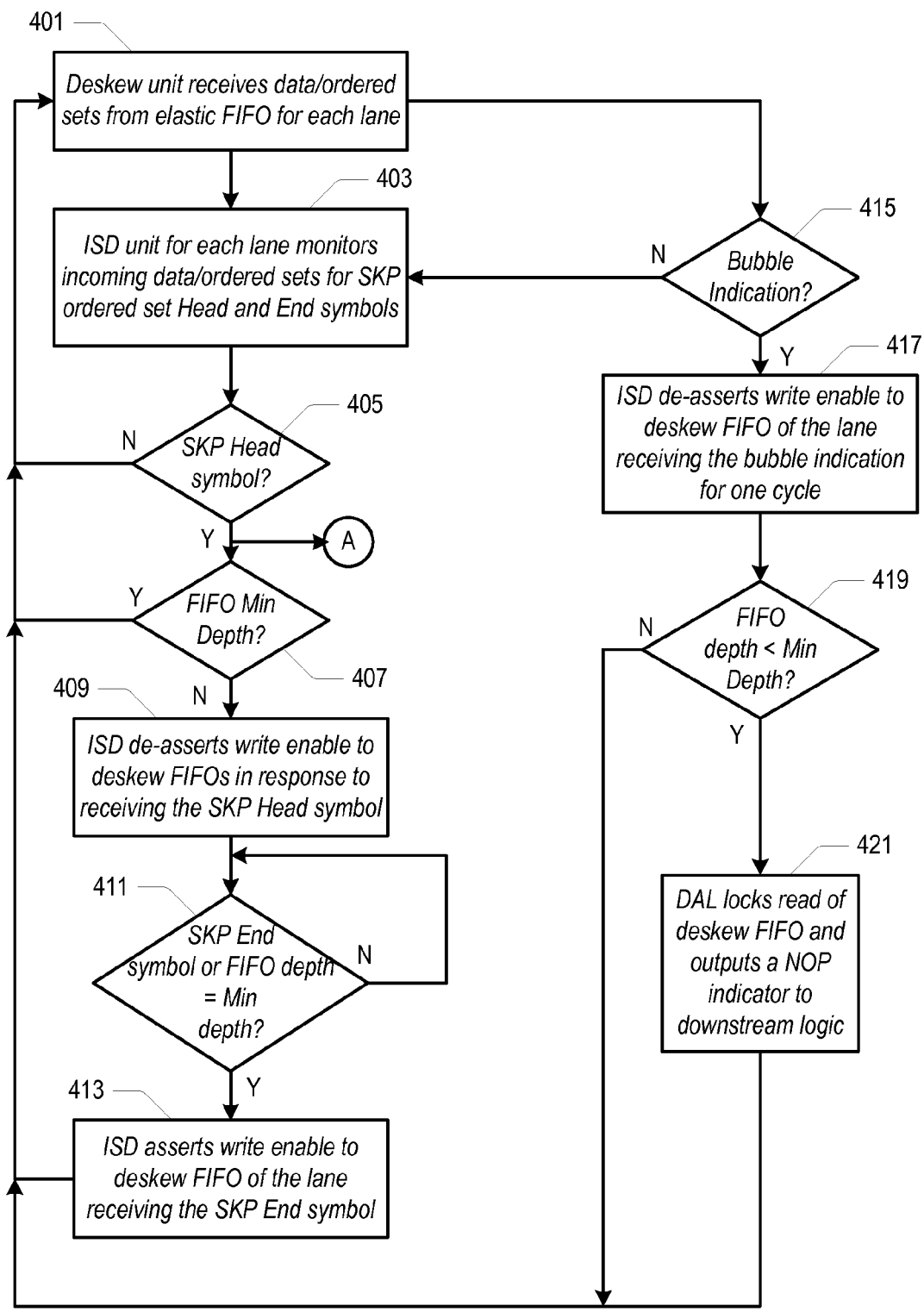
FIG. 4 is a flow diagram depicting operational aspects of one embodiment of the dynamic deskew unit shown in FIG. 2 and FIG. 3.
Figure 5:
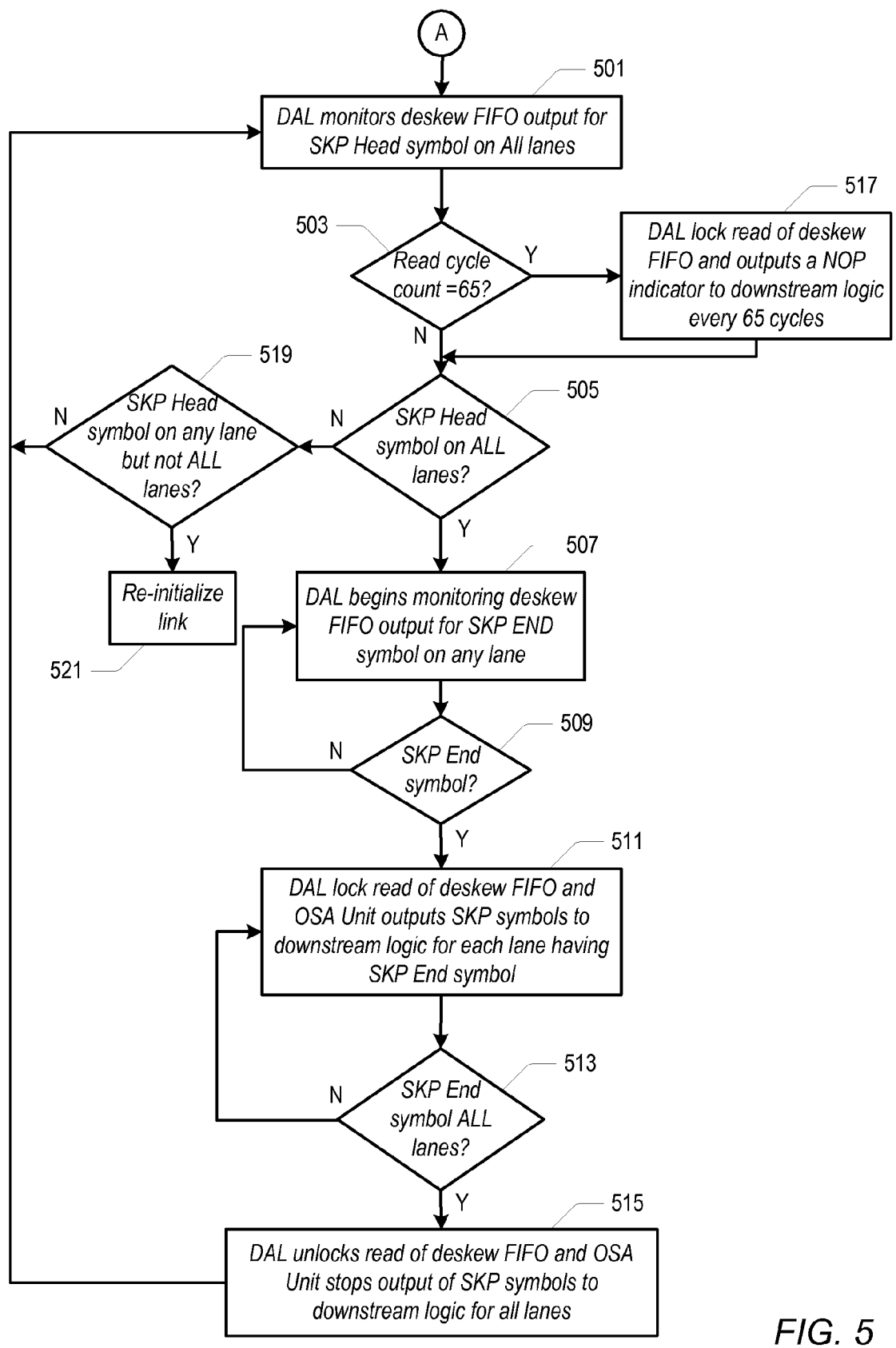
FIG. 5 is a flow diagram depicting additional operational aspects of one embodiment of the dynamic deskew unit shown in FIG. 2 and FIG. 3.

In FIG. 4 and FIG. 5, flow diagrams depicting operational aspects of one embodiment of the dynamic deskew unit of FIG. 2 and FIG. 3 are shown. More particularly, FIG. 4 describes operational aspects of primarily the write side control and operation of the deskew FIFO 311 and FIG. 5 describes operational aspects of the read side control and operation of the deskew FIFO 311. Referring collectively to FIG. 1 through FIG. 4 and beginning in block 401 of FIG. 4, the deskew unit 217 receives ordered sets from the upstream elastic FIFO, as described above. The ISD unit 313 for each lane monitors incoming data for SKP OS head symbols (block 403). If the ISD unit 313 doesn't detect an SKP OS head symbol (block 405), operation proceeds as described above in conjunction with the description of block 401.

However, if any ISD unit 313 detects an SKP OS head symbol (block 405) but the deskew FIFO 311 is already at the minimum depth (block 407) then operation continues as described above in conjunction with the description of block 401. If the depth of the deskew FIFO 311 is greater than the minimum depth (block 407), ISD units 313 may de-assert the Wr En to the deskew FIFOs 311 to prevent any additional SKP symbols from being written into the deskew FIFOs 311, as described above.

The ISD unit 313 continues to monitor incoming symbols for a SKP OS End symbol, and keeps the Wr En signal de-asserted if there is no SKP OS End symbol and the FIFO depth is greater than the minimum depth (block 411). If the ISD unit 313 detects a SKP OS End symbol or the FIFO depth equals the minimum depth, the ISD unit 313 may re-assert the Wr En signal (block 413). Operation proceeds as described above in conjunction with the description of block 401.

Referring back to block 401, during operation, an idle cycle may be created by upstream decoder logic thereby sending non-data to the deskew logic as described above. If no Idle indication is received, operation proceeds as described above in conjunction with the description of block 403. If, however, an Idle indication is received (block 415), the ISD unit 313 may de-assert the Wr En to the deskew FIFO 311 for one cycle to prevent the bubble non-data from being written (block 417). In addition, if the deskew FIFO 311 is less than the minimum depth (block 419), the dynamic alignment unit 317 may also lock the read pointer on the deskew FIFO 311 on all lanes, and provide a NOP/Idle indication to downstream logic 219 (block 421). Otherwise, if the deskew FIFO 311 is greater than or equal to the minimum depth, operation proceeds as described above in conjunction with the description of block 401.

Referring back to block 405, if an SKP OS Head symbol is received on a given lane, that SKP OS Head symbol is written into the deskew FIFO 311, and upon detection, the dynamic alignment unit 317 may begin looking for occurrences of SKP OS End symbols. Thus, turning to FIG. 5, and beginning in block 501, the dynamic alignment unit 317 may monitor the output of the deskew FIFOs 311 of all lanes for SKP OS Head symbols. In addition, the dynamic alignment unit 317 may, in one embodiment, count the number of read cycles (block 503), and every 65 cycles, the dynamic alignment unit 317 may lock the read pointer of all deskew FIFOs 311 and provide a NOP indication to downstream logic (block 517).

If there is not a SKP OS Head symbol on all lanes (block 505), the link may need to be re-initialized. More particularly, in one embodiment, if the SKP Head symbols appear at the output of any deskew FIFOs 311, but not on all lanes (block 519), this may indicate that bit flipping on the link or some other error may have occurred on some of the lanes. In this situation, the DAL unit 317 may send a request to for link re-training, link re-initialization or link recovering (block 521). However, referring back to block 505 once a SKP OS Head symbol has been received on all lanes, the dynamic alignment unit 317 may begin monitoring the output of the deskew FIFOs 311 of all lanes for a SKP End symbol on any lane (block 507). If a SKP OS End symbol is detected (block 509), the dynamic alignment unit 317 may lock the read pointer of the deskew FIFO 311 in which the SKP OS End symbol was detected. In addition, the dynamic alignment unit 317 may provide an SKP enable signal to the corresponding OSA unit 315, and mux 351. The OSA 315 generates and provides dummy SKP symbols having a predetermined symbol value, while the mux 351 selects the output of the OSA unit 315 as the data for the downstream logic (block 511).

The dynamic alignment unit 317 may continue to monitor all the lanes for a SKP OS End symbol (513). Once a SKP OS End symbol appears at the output of all deskew FIFOs 311, the dynamic alignment unit 317 may unlock the read pointers of all deskew FIFOs 311, and de-assert the SKP enable signal. In response, the muxes 351 select the output of the deskew FIFOs 311, and the OSA units 315 may stop generating the SKP symbols (block 515). The data for all lanes is now aligned (SP OS End symbol will be sent on all lanes, followed by data) and the skew has been dynamically removed. Operation proceeds as described above in conjunction with the description of block 501.

Accordingly, all lanes may be dynamically deskewed, and the asynchronous arrival of idle cycle non-data can be handled appropriately through the use of the deskew FIFO, and a small amount of control logic on each lane.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A receiver unit for connection to a communication link having a plurality of communication lanes, the receiver unit comprising:
    for each lane of the plurality of lanes:
        a first-in first-out (FIFO) unit including a plurality of storage locations, wherein the FIFO unit is configured to store received symbols to locations pointed to by a write pointer and to output to downstream logic, the symbols stored at locations pointed to by a read pointer;
        a symbol drop unit coupled to the FIFO unit and configured to disable the write pointer in response to receiving a start symbol of a set of alignment symbols and in response to a determination that the number of storage locations within the FIFO storage unit is greater than a minimum predetermined number, and to enable the write pointer in response to receiving an end symbol of the set of alignment symbols;
    an alignment unit coupled to the FIFO unit and configured to disable the read pointer in response to detecting that the end symbol has been received on one or more lanes but not all lanes of the plurality of lanes;
    wherein the alignment unit is further configured to enable the read pointer in response to a determination that the end symbol has been received on all lanes of the plurality of lanes.

2. The receiver unit of claim 1, further comprising a symbol assertion unit coupled to the FIFO unit and configured to generate alignment symbols for transmission to the downstream logic while the read pointer is disabled.

3. The receiver unit of claim 1, wherein the minimum predetermined number is two.

4. The receiver unit of claim 1, wherein the symbol drop unit is further configured to enable the write pointer in response to a determination that the number of storage locations within the FIFO storage unit equals the minimum predetermined number.

5. The receiver unit of claim 4, wherein the alignment unit is further configured to disable the read pointer for all lanes in response to receiving the indication that a non-data symbol corresponding to an idle cycle is present on the lane, and in response to a determination that the number of storage locations within the FIFO storage unit is less than a minimum predetermined number.

6. The receiver unit of claim 1, wherein the symbol drop unit is further configured to disable the write pointer for one cycle in response to receiving an indication that a non-data symbol corresponding to an idle cycle is present on the lane.

7. The receiver unit of claim 1, wherein the alignment unit is further configured to disable the read pointer for all lanes, for one cycle, every 65 cycles, and to provide to the downstream logic an indication that the symbol being sent for the one cycle is non-data.

8. The receiver unit of claim 1, wherein the alignment symbols comprise SKIP ordered set symbols.

9. The receiver unit of claim 1, wherein the alignment unit is further configured to request a link re-initialization of the communication link in response to determining that the start symbol has been received on one or more lanes but not all lanes of the plurality of lanes.

10. A method for dynamically deskewing a communication link having a plurality of lanes, the method comprising:
during operation of the communication link, for each lane, selectively enabling and disabling a write pointer and a read pointer of a respective corresponding first-in first-out (FIFO) storage unit;
wherein selectively enabling and disabling the write pointer and the read pointer includes:
disabling the write pointer in response to receiving a start symbol of a set of alignment symbols and in response to a determination that the number of storage locations within the FIFO storage unit is greater than a minimum predetermined number;
enabling the write pointer in response to receiving an end symbol of the set of alignment symbols;
disabling the read pointer in response to receiving the end symbol and in response to a determination that the end symbol has not been received on all lanes of the plurality of lanes;
enabling the read pointer in response to a determination that the end symbol has been received on all lanes of the plurality of lanes.

11. The method of claim 10, wherein the minimum predetermined number is two.

12. The method of claim 10, further comprising for each lane, disabling the write pointer for one cycle in response to receiving an indication that a particular received symbol corresponds to non-data.

13. The method of claim 10, further comprising disabling the read pointer for all lanes, for one cycle, every 65 cycles, and providing an indication to downstream logic that the symbol being sent is non-data.

14. The method of claim 10, further comprising transmitting a dummy alignment symbol each cycle to downstream logic while the read pointer is disabled in response to receiving the end symbol.

15. The method of claim 10, wherein the alignment symbols comprise SKIP ordered set symbols.

16. The method of claim 10, further comprising disabling the write pointer in response to receiving an indication that a non-data symbol corresponding to an idle cycle is present on the lane.

17. The method of claim 16, further comprising disabling the read pointer in response to receiving the indication that a non-data symbol corresponding to an idle cycle is present on the lane, and in response to a determination that the number of storage locations within the FIFO storage unit is less than a minimum predetermined number.

18. A system comprising:
a transmitter unit;
a receiver unit coupled to the transmitter unit via a communication link having a plurality of communication lanes;
wherein the receiver unit includes:
for each lane of the plurality of lanes:
a first-in first-out (FIFO) unit including a plurality of storage locations, wherein the FIFO unit is configured to store received symbols to a locations pointed to by a write pointer and to output to downstream logic, the symbols stored at locations pointed to by a read pointer;
a symbol drop unit coupled to the FIFO unit and configured to disable the write pointer in response to receiving a start symbol of a set of alignment symbols and in response to a determination that the number of storage locations within the FIFO storage unit is greater than a minimum predetermined number, and to enable the write pointer in response to receiving an end symbol of the set of alignment symbols;
an alignment unit coupled to the FIFO unit and configured to disable the read pointer in response to detecting that the end symbol has been received on one or more lanes but not all lanes of the plurality of lanes;
wherein the alignment unit is further configured to enable the read pointer in response to a determination that the end symbol has been received on all lanes of the plurality of lanes.

19. The system of claim 18, wherein the receiver unit further includes a symbol assertion unit coupled to the FIFO unit and configured to generate dummy symbols having a predetermined value for transmission to the downstream logic while the read pointer is disabled.

20. The system of claim 18, wherein the symbol drop unit is further configured to disable the write pointer for one cycle in response to receiving an indication that a non-data symbol corresponding to an idle cycle is present on the lane.

21. The system of claim 20, wherein the alignment unit is further configured to disable the read pointer in response to receiving the indication that a non-data symbol corresponding to an idle cycle is present on the lane, and in response to a determination that the number of storage locations within the FIFO storage unit is less than a minimum predetermined number.

22. The system of claim 18, wherein the alignment unit is further configured to disable the read pointer for all lanes, for one cycle, every 65 cycles, and to generate an idle cycle for consumption by the downstream logic and to provide an indication that the symbol being sent for the one cycle is non-data.

* * * * *

UNITED STATES PATENT AND TRADEMARK OFFICE
CERTIFICATE OF CORRECTION

PATENT NO.        : 8,913,705 B2                                           Page 1 of 1
APPLICATION NO.   : 13/595338
DATED             : December 16, 2014
INVENTOR(S)       : Chang It is certified that error appears in the above-identified patent and that said Letters Patent is hereby corrected as shown below:

In the Specification

In column 5, line 61, delete "Wr en" and insert -- Wr En --, therefor.

In column 6, line 8, delete "Wr_En" and insert -- Wr En --, therefor.

In column 6, line 45, delete "a an" and insert -- an --, therefor.

Signed and Sealed this
Eleventh Day of August, 2015

Michelle K. Lee
*Director of the United States Patent and Trademark Office*